Nov. 11, 1924.  
R. CHILTON  
STARTING DEVICE  
Filed June 15, 1923  
1,514,832
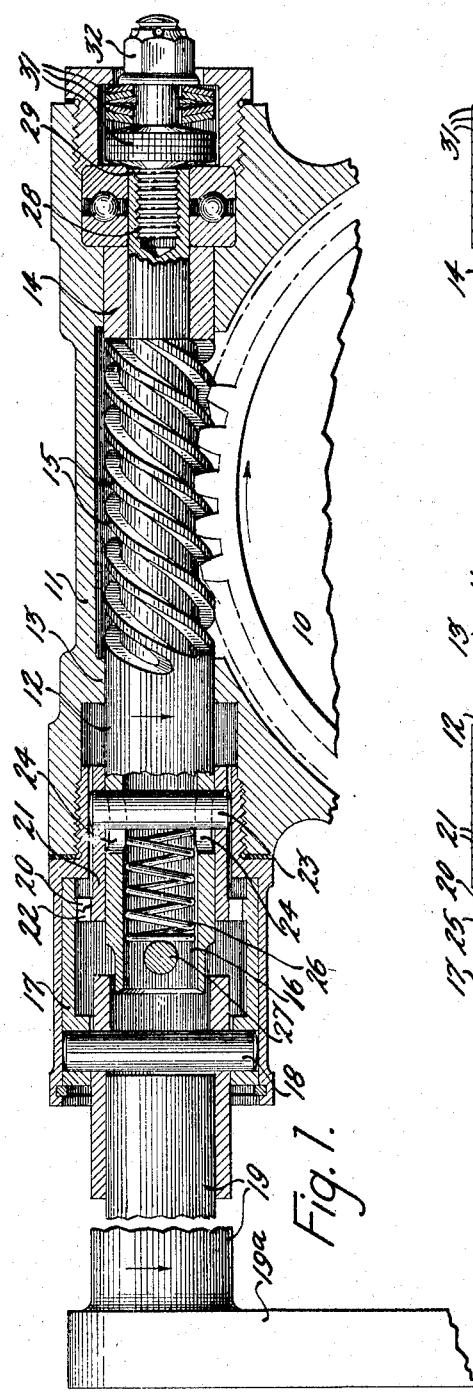
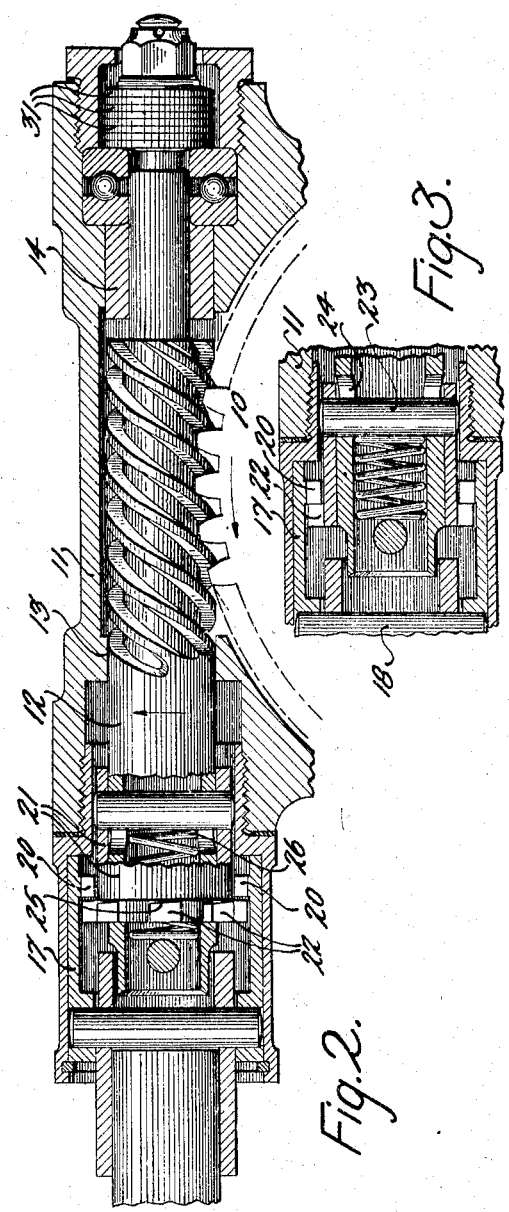
INVENTOR  
Roland Chilton  
BY  
Werner G. Rothermund  
ATTORNEY Patented Nov. 11, 1924.

1,514,832

UNITED STATES PATENT OFFICE.

ROLAND CHILTON, OF KEYPORT, NEW JERSEY, ASSIGNOR TO AEROMARINE PLANE & MOTOR COMPANY, A CORPORATION OF NEW YORK.

STARTING DEVICE.

Application filed June 15, 1923. Serial No. 645,706.

*To all whom it may concern:*

Be it known that I, ROLAND CHILTON, a subject of the King of England, and a resident of Keyport, in the county of Monmouth and State of New Jersey, have invented certain new and useful Starting Devices, of which the following is a specification, reference being had to the accompanying drawings, forming part of this specification.

This invention relates to starting devices, especially those of the type wherein a driving connection in a mechanism is disconnected when the parts are subjected to an overload. An engine starter is used in this application to illustrate a mechanism where an overload release is desirable, and in the particular showing of the drawings a geared hand crank is disclosed, the mechanism in this instance providing a safety release therefor.

In the prior art there are a number of overload releasing devices wherein a jaw clutch or equivalent connection is moved by the load towards and into a disengaged position against the action of a spring. Such constructions are subject to very rapid wear and liability of fracture because when the release is effected the opposing spring is under maximum load. Instantly the release has taken place, the full pressure of the spring is tending to urge the clutching members into remeshed position, while one of the members is then usually over-running the other at high relative speed. This causes a clashing action on the clutching faces or jaws, which rapidly destroys the surfaces, principally by grinding off the corners at which the meshing takes place.

The principal object of the present invention is to afford, in a releasing device of the type described, means whereby the spring pressure does not tend to force the parts into remeshed relation following on their disengagement.

A further object of this invention is to afford means to prevent the remeshing of the parts until the speed difference between them is relatively low.

The fact that the full spring pressure in devices of the prior art tends to produce remesh immediately following demeshing often causes those devices to forcibly bring the disengaged members into violent reengagement, while they are rotated at widely different speeds which results in serious damage to the parts.

I attain these objects of my invention by mounting one member, conveniently, the retractable member of the clutch connection, so that it shall have some freedom of motion relative to the main spring of the device. In this way, while the retracting tendency on the demeshing member, due to the drive is directly transmitted from the spring, the spring on recovery does not transmit its motion directly to the mesh member but only through the action of a relatively light spring which is insufficient to produce remeshing of the members except when rotating at substantially the same speed at low velocity.

Various other objects and advantages of the invention will be in part obvious from an inspection of the accompanying drawings, and a careful consideration of the following particular description and claims of one form of mechanism embodying my invention.

In the drawings:—

Figure 1 is a fragmentary vertical longitudinal section of an engine starting mechanism taken approximately at the center, showing a preferred embodiment of my invention as applied thereto. The normal starting postion of the elements is herein shown.

Figure 2 is a fragmentary vertical longitudinal section similar to Fig. 1 showing the elements in their relative positions following on an engine backfire.

Figure 3 is a fragmentary vertical section of some of the elements illustrating a third position.

In the present instance 10 designates a worm wheel rotatably mounted in a housing 11 and drivably connected to a shaft (not shown) of an engine to be started. A shaft 12 is rotatably supported in the bearings 13, 14, in a manner so as to permit of it being moved axially, said shaft having a worm 15 formed thereon which meshes with the worm wheel 10. The shaft 12 has a hollow portion 16.

Rotatably mounted in a portion of the housing 11 and suitably held against end motion therein is a cylindrical member 17, to which is secured as by means of the pin 18, a shaft 19, having a crank handle 19ª, said member 17 being provided with a series of inwardly extending teeth or splines 20.

Slidably mounted on the shaft 12 and adjacent to the hollow portion 16, is a sleeve 21 having a series of outwardly extending teeth or splines 22 similar to the splines 20 and adapted to mesh therewith. The splines 22 are backed off or slightly chamfered as at 25, the purpose of which will be more fully described hereinafter. A pin 23 is secured in the sleeve 21 said pin passing diametrically through the shaft 12, and by means of elongated openings 24 the sleeve 21 is permitted to have relative longitudinal movement on the shaft 12, but is prevented from relative rotational movement. Disposed within the hollow portion 16 is a preferably light compression spring 26, bearing against the pin 23 and held under tension as by a pin 27 secured in the shaft 12.

An extension to the shaft 12 is provided by a stud 28 preferably screw threaded into the end 29 of the shaft 12. Mounted on this stud are a plurality of spring disks 31 which constitute the main spring of this device, said disks being secured on the stud by a nut 32 by means of which the tension of the spring disks can be adjusted.

The spring disks may be placed under such initial load by the nut 32 as to normally withstand without further deflection the driving effort of the worm 15 upon the worm wheel 10 when the engine is started under normal conditions by the rotation of the handle 19$^a$.

In operation and assuming the elements first in their normal operative positions prior to the starting of the engine as shown in Fig. 1, the handle 19$^a$ in the present instance is rotated in a clockwise direction. It will be seen that the splines 20 of the cylindrical member 17 and the splines 22 of the sleeve 21 are in a meshed position thus it is apparent that upon rotation of the handle 19$^a$ the worm will be caused to operate the worm wheel 10 and the shaft (not shown) of the engine to be started, (direction of rotation as indicated by the arrows).

With reference to Fig. 2, when an overload occurs such as a backfire in the engine, the worm wheel will be suddenly and violently reversed, this sudden reversal of the worm wheel will cause the worm to be shifted axially against the tension of the spring disks 31 which will be materially deflected. The axial movement of the worm will cause a demeshing of the splines 20 and 22 and a release of the hand crank shaft 19. Following on this sudden shock, and the resultant axial movement of the worm caused by the violent reversal of the worm wheel, the worm will be rapidly rotated by the worm wheel due to the steep pitch of the helix and concomitantly with such rotation the spring disks will tend to retract the worm axially to its former position. As the worm is thus retracted the splined members will attempt to remesh, but as the spring disks cannot transmit retracting axial motion to the sleeve 21, directly, but only through the relatively light spring 26, it being remembered that the sleeve is adapted to have longitudinal movement on the shaft 12, a remeshing will be effectively prevented by reason of said light spring having insufficient power to produce a remeshing while the worm is being rotated at relatively high speed, the chamfered portion 25 of the splines 22 materially assisting in preventing such a remeshing.

When an overload occurs other than a backfire or the worm wheel 10 is locked against rotation for any reason, the rotation of the handle 19$^a$ will cause the worm to be moved axially due to the action of the helix against worm wheel and a demeshing will result as hereintofore described.

It will be understood that the present invention is not restricted in its application to a starting mechanism as shown herein it being obvious that it can readily be applied to mechanisms other than that shown where an overload release is desirable.

Variations may be resorted to within the scope of the invention and portions of the improvements may be used without the others whilst not departing from the spirit of the invention.

Having thus described my invention, I claim:—

1. In apparatus of the class described, a driving clutch member, a driven clutch member adapted for retraction from the first said member upon the suitable yielding of a spring to the driving load, the driven clutch member so connected to said spring as not to be subject to movement therefrom tending to remesh said clutch member, and a relatively light spring tending to produce such remesh.

2. In apparatus comprising a driving means and a driven means, a clutch connection therebetween including a retractable member mounted for clutching and declutching action, a spring responsive to the driving load and connected to said retractable member by a means adapted to cause demesh of said member upon a certain degree of spring compression being reached and such that said spring upon recovery shall not tend to remesh said retractable member, and a relatively light spring tending to remesh said retractable member.

3. In apparatus of the class described, a severable clutch connection responsive for demesh to the compression of a load subject spring, and for remesh responsive to the action of a relatively light spring independent of said load subject spring.

4. In apparatus of the class described, a spring adapted to sustain a normal driving load and to yield under abnormal load and so connected to a clutching means as to effect a demeshing thereof upon compression of the said spring and to permit of recovery of said spring without remeshing said clutch means and a light spring tending to remesh said clutch means.

5. An overload releasing device comprising a spring responsive to the load transmitted and having a one-way connection with a clutch means such that a certain degree of compression of said spring shall effect demesh of said clutching means, means so constituted that the recovery of said spring will not effect a remeshing of the clutch means, and a minor spring means tending to effect a remeshing.

6. A load releasing device comprising, a load subject spring, a clutch and a connection therebetween adapted to effect a declutching from the yielding of said spring, but incapable of effecting a reclutching upon a recovery of said spring and means independent of said spring for effecting a reclutching when desired.

7. In a driving mechanism, a spring adapted to yield under excessive loads and means for actuating a clutch from the yielding movement of said spring to effect a declutchment, said actuating means being incapable of effecting a reclutching action and other means tending to effect such reclutching action.

8. In a starter mechanism, a clutch operated for declutching action but not for reclutching by the yielding of a load subject spring, and means independent of said spring for effecting a reclutching.

9. An overload release device including, a jaw clutch connection so connected to a load subject spring as to be brought into disengaged position by yielding of said spring, means whereby said spring may recover without reengaging said clutch connection, and a subsidiary means tending to reengage said clutch.

10. A driving connection for releasing under excessive loads including, a spring adapted to yield under excessive loads to disengage a clutch connection, a means yieldably held to prevent reengagement of said clutch connection upon recovery of said spring, and subsidiary spring means tending to reengage said clutch connection.

11. In a device for transmitting a predetermined load, a relatively strong spring subject to the load transmitted and so connected to a jaw clutch connection as to demesh the same upon a yielding of said spring, and so as to permit said clutch to remain demeshed upon recovery of said spring, and a relatively weak spring tending to remesh said clutch.

12. An overload release device comprising, a rotary drive transmitting member so organized as to be subject to axial movement under excessive loads in opposition to a calibrated spring, a clutch connection for normally driving said driving member and adapted to be demeshed by said axial movement, yielding means whereby a reverse axial movement of the driving member shall be unable to remesh the clutch, and subsidiary means imposing a slight remeshing pressure upon said clutch.

13. A load limiting power transmission device incorporating in combination, a driving member supported in normal position by a major spring means adapted to disengage a clutch upon yielding of said spring means, and a minor spring means permitting the major spring to return the driving member to normal position without remeshing the said clutch.

14. In a worm and wheel drive, a spring opposed to the thrust of the worm and adapted to yield for axial motion of the worm under overload, a clutch connection adapted normally to drive the worm and to be disengaged by said axial motion thereof, and means whereby the return of the spring to unyielded position shall not reengage the clutch and means for producing a gentle reengaging pressure on said clutch.

15. In apparatus of the class described, a severable driving connection, a drive transmitting element maintained in normal position by a spring adapted to yield under an overload, and means whereby said yielding shall sever said driving connection, and further means whereby said drive transmitting element may return to normal position without reestablishing the driving connection aforesaid.

16. A power transmitting device including, a worm adapted to drive a worm wheel and restrained in a normal position by a spring adapted to yield under overload to permit an axial movement of said worm away from normal position, a driven clutch member mounted for rotation with said worm and for axial movement therewith when said movement is away from normal position but free to permit axial movement of the worm towards normal position without axial movement of said clutch member, and a driving clutch member adapted normally to be meshed by said driven clutch member.

17. In apparatus of the class described, a retractable element of a severable clutch drivably mounted on a worm for axial movement therewith in one direction and axial movement thereon in the other direction, an abutment adapted to yield for axial movement of said worm with said retractable element and independent means for remeshing said retractable element.

18. In an overload releasing device in combination, a driving means having a clutch element, an axially shiftable driven member having a clutch element thereon adapted to engage the first said clutch element, means tending to maintain the clutch elements in engagement, resilient means associated with the driven member so constituted as to withstand without deflection a predetermined load and responsive to an overload to effect an axial displacement of the driven means so as to move its associated clutch element to a released position, means whereby said clutch element may remain in a released position when the resilient means recovers from its deflection.

19. In apparatus of the class described in combination, a driving means having a clutch element, an axially shiftable driven member having a clutch element thereon normally in engagement with the first said clutch element, a main spring associated with the driven member so disposed as to be responsive to an overload to effect an axial displacement of the driven means so as to move its associated clutch element to a released position, a subsidiary spring tending to effect a reengagement of the clutch elements and means whereby the tendency of the subsidiary spring to establish a reengagement of the clutch elements will be overcome while said elements are rotating at relatively different speeds.

20. In an overload releasing device, in combination, a driving means, an axially shiftable driven means, a clutch connection therebetween comprising two engaging elements, one element of said clutch mounted on the driven means and having relative longitudinal movement thereon, a major and a minor spring means, the minor spring means tending to maintain the clutch elements in an engaged position, the major spring means adapted to be deflected by an overload to effect an axial displacement of the driven means so as to sever the clutch connection, the clutch elements so organized as to prevent a remeshing while one element thereof is rotating at relatively high speed to the other.

21. In a starting device for engines, in combination, an engine to be started, a worm wheel connected to the engine shaft, a worm in mesh with the worm wheel, a driving means for the worm, a severable clutch connection between the driving means and the worm, the worm arranged for axial displacement so as to sever the clutch connection when so displaced, a spring means responsive to overload conditions to permit an axial displacement of the worm, further spring means tending to maintain the clutch connection, the last said spring means of lesser capacity than the first said spring means.

22. In a releasing device for an engine starter, in combination, a driving means having a clutch element, a driven means having a clutch element adapted to mesh with the first said clutch element, a comparatively light spring tending to maintain the clutch elements in a meshed position the driven means being adapted to release the clutch elements upon a predetermined deflection of a fixed capacity spring associated therewith, the clutching elements being dependent on the first said spring for a remeshing.

23. In an overload release device, a meshing clutch connection, a load control spring actuated by an overload to effect a demeshing of the clutch, said clutch so constituted as to permit said spring to instantly recover without causing a remeshing action, and a relatively weak spring tending to produce meshing of the clutch.

24. In an overload releasing device, in combination, a driving means, a driven means, a severable clutch connection therebetween, a minor spring means tending to maintain the clutch connection in engagement, the driven means being arranged for axial displacement by an overload so as to disengage the clutch connection, and an adjustable control means comprising a major spring to govern said axial displacement, said driven means adapted to be retracted by the spring without reengaging the clutch connection.

25. In apparatus of the class described, in combination, a driving means, a driven means, a meshing clutch connection therebetween, a meshing spring means and a demeshing control spring means for the clutch, the demeshing control spring means responsive to a driven load in excess of the power of said spring so as to permit a demeshing of the clutch, means permitting the action of the meshing spring means to become effective only when the relative rotational speed between the driving and the driven means is low.

26. In a load limiting means for an engine starting mechanism, the combination with an engine to be started, of a driving means, a means normally engaged and driven thereby, a first spring means, a second and minor spring means, both spring means acting independently of each other to maintain an engagement of the driving and the driven means, the first spring means so connected to the driven means as to cause a release of the driving from the driven means when the mechanism is subjected to an overload and other means whereby reengagement of the driving with the driven means is dependent on the minor spring means only.

27. In apparatus of the class described, in combination, a housing, a worm wheel therein adapted to be connected to an engine shaft, an axially shiftable worm, a clutch element on the worm and axially shiftable relatively thereto, a driving means, a clutch element thereon adapted to mesh with the first said clutch element, a spring means adapted to control the shifting of the worm and its associated clutch element in a demeshing movement, a further spring means of lesser capacity, the last said clutch element dependent for a remeshing movement upon the last said spring means alone.

28. The combination with an engine to be started, of an overload release mechanism comprising, a driving member, a driven member, the driven member connected to an engine shaft, a meshing clutch connection between the driving and the driven members, the driven member adapted to cause a demeshing of clutch connection subject to a resilient means calibrated to withstand a predetermined driving load, a lesser resilient means on which the clutch is dependent for a remeshing, and other means adapted to preclude the lesser action of the resilient means when the rotational speed between the driving and the driven members is relatively high.

29. In a device of the character described, in combination, a driving means, a driven means, the driven means adapted to drivably engage the driving means, a plurality of spring means adapted to maintain the driven means in an engaged position with the driving means, one of said spring means having a fixed capacity and adapted to be effected by a driving load in excess of its capacity to cause a release of driven means from the driving means, means so constituted as to permit said spring to recover without reengaging the driving with the driven means, said reengagement being dependent on the action of the other of said spring means, and means adapted to render ineffective the reengaging action of said spring when the difference of rotation between the driving and the driven members is substantial.

30. In a safety release mechanism for engine starters, in combination, an engine to be started, a drive shaft on the engine, a gear on the shaft, a worm meshing with the gear, a driving means for the worm, a releasable clutch connection normally engaged between the driving means and the worm, a spring adapted to permit a release of the clutch connection when said spring is deflected, the reengagement of said clutch connection confined to the action of a second spring means.

31. In apparatus of the class described, in combination, a worm wheel adapted to be connected to an engine shaft, a shaft having a worm in mesh with the worm wheel, the shaft supported in a bearing and axially shiftable therein, a clutch element on the shaft and slidable relatively thereto, a spring means adapted to maintain said clutch element in engagement with a driving clutch element, a further spring means disposed on the shaft and responsive to an overload imposed on the worm wheel to permit the shaft to be shifted axially so as to separate the clutching elements, means to prevent return of the clutching element with the shaft.

32. In a device of the class described, a rotatable member mounted in a bearing and meshing with a gear to be driven thereby, said member adapted to be axially displaced under overload conditions, a driven clutch means slidably mounted on the rotatable member and secured against relative rotation thereon, a driving clutch means rotatably mounted in a bearing and normally engaged by the driven clutch means, a spring means to control the axial displacement of the rotatable member responsive to an overload so as to permit an axial displacement of said member with its associated clutch means to effect a release from the driving means, the rotatable member adapted for retraction by the said spring means when the overload is relieved, the driven clutch means so constituted as not to be retracted therewith and dependent on a minor spring means for reengagement with the driving clutch means.

33. In apparatus of the class described, in combination, a gear, a shaft comprising a worm mounted in a bearing, said worm in mesh with a gear and axially shiftable thereby, a driving means having clutch teeth, a clutch member having chamfered teeth adapted to engage with the teeth of the driving means, said clutch member slidably mounted on the shaft and adapted to be moved thereby to a demeshed position, a spring means normally maintaining the teeth of the driving means and the clutch member in a meshed position, a further spring means associated with the shaft and adapted to control the axial movement thereof, said teeth of the driving means and the clutch member so formed as to prevent a remeshing when the shaft is retracted by the last said spring means, and means to adjust said spring.

34. In apparatus of the class described, in combination, a driving means and a driven means, a calibrated spring means associated with one of said means to permit an axial movement thereof under excessive loads, a clutch element adapted to be moved to demeshed position by said movement, and means to prevent the return of the clutching element with the axially movable means set forth when said spring recovers.

35. In a driving connection, a worm wheel, a worm meshing therewith, said worm mounted for rotative and axial movement, a load spring to control the axial movement thereof, a driving means for the worm, a clutch connection between the driving means and worm, a comparatively light spring tending to produce a meshing of the clutch, said load spring adapted to permit an axial shifting of the worm to demesh the clutch upon an overload and an axial retraction of the worm upon recovery of the spring without imposing a meshing action on the clutch.

36. In a safety starting device for an engine, the combination with an engine to be started, of a worm wheel connected to the engine shaft, a worm meshing therewith, said worm mounted for rotative and axial movement, a load spring to control the axial movement thereof, a manually operated driving means for the worm, a clutch connection between the driving means and the worm, said load spring adapted to effect an axial shifting of the worm to demesh the clutch upon an overload and an axial retraction of the worm without remeshing the clutch, and a relatively light spring adapted to produce a remesh of the clutch when the rotation has substantially ceased.

37. In a clutch mechanism, a pair of clutch elements, a driven means on which one of said elements is slidably mounted, a driving means on which the other of said clutch is mounted, a calibrated and adjustable spring means, the driven member adapted to be shifted with its clutch element to a disengaging position when an overload is imposed on the spring said driven member further adapted to be retracted by said spring when the clutch has been released, said clutch element adapted to be restored to its initial position by a relatively weak spring when relative movement between the elements is low.

Signed at Keyport, in the county of Monmouth and State of New Jersey, this 13th day of June, 1923.

ROLAND CHILTON.